(12) United States Patent
Schütz et al.

(10) Patent No.: US 7,108,276 B2
(45) Date of Patent: Sep. 19, 2006

(54) GAS BAG MODULE

(75) Inventors: Dominik Schütz, Waldaschaff (DE); Ralf Scherer, Aschaffenburg (DE); Michael Schneider, Sulzbach (DE)

(73) Assignee: TRW Automotive Safety Systems GmbH, Aschaffenburg (DE)

( * ) Notice: Subject to any disclaimer, the term of this patent is extended or adjusted under 35 U.S.C. 154(b) by 270 days.

(21) Appl. No.: 10/727,001

(22) Filed: Dec. 3, 2003

(65) Prior Publication Data

US 2004/0108690 A1    Jun. 10, 2004

(30) Foreign Application Priority Data

Dec. 4, 2002    (DE) ................ 202 18 740 U

(51) Int. Cl.
*B60R 21/16*    (2006.01)
(52) U.S. Cl. .................... 280/728.2; 280/731
(58) Field of Classification Search ........... 280/731, 280/728.2, 728.3
See application file for complete search history.

(56) References Cited

U.S. PATENT DOCUMENTS

| 5,382,046 A | | 1/1995 | Cuevas | |
|---|---|---|---|---|
| 5,577,768 A | | 11/1996 | Taguchi et al. | |
| 5,580,080 A | * | 12/1996 | Soderquist et al. | 280/728.2 |
| 5,692,773 A | * | 12/1997 | Ono | 280/728.2 |
| 5,700,029 A | * | 12/1997 | Enders | 280/728.2 |
| 5,775,725 A | * | 7/1998 | Hodac et al. | 280/728.2 |
| 6,092,832 A | | 7/2000 | Worrell et al. | |
| 6,149,184 A | * | 11/2000 | Ennis et al. | 280/728.2 |
| 6,196,573 B1 | * | 3/2001 | Worrell et al. | 280/728.2 |
| 6,679,518 B1 | * | 1/2004 | Varcus et al. | 280/728.2 |
| 2001/0011815 A1 | | 8/2001 | Ikeda et al. | |
| 2001/0035631 A1 | | 11/2001 | Hasebe | |
| 2002/0109337 A1 | | 8/2002 | Kassman et al. | |

* cited by examiner

*Primary Examiner*—Faye M. Fleming
(74) *Attorney, Agent, or Firm*—Tarolli, Sundheim, Covell & Tummino LLP

(57) ABSTRACT

A gas bag module has several detent hooks by which it can be fastened to a component which is fixed to a vehicle, and a sheet metal carrier plate with a substantially flat base section. The detent hooks are connected in one piece with the base section and project therefrom.

13 Claims, 6 Drawing Sheets

GAS BAG MODULE

TECHNICAL FIELD

The invention relates to a gas bag module.

BACKGROUND OF THE INVENTION

The fastening of a gas bag module to the vehicle, whether to the steering wheel, to the instrument panel or to a vehicle seat, must remain stable over the entire lifespan of the module, must withstand the stress on unfolding of the gas bag and must also be lightweight and have as little volume as possible.

BRIEF SUMMARY OF THE INVENTION

It is an object of the invention to provide a gas bag module with a secure lightweight fastening.

This is achieved in a bag module that has several detent hooks by which it can be fastened to a component which is fixed to a vehicle, and a sheet metal carrier plate with a substantially flat base section. The detent hooks are connected in one piece with the base section and project therefrom.

Here, both the base section and also the detent hooks consist only of sheet metal. The manufacturing expenditure is low, and such a fastening device has only a low weight with the required stability. Through the connecting of several detent hooks in one piece with a base section, firstly the stability of the fastening is increased and secondly a short installation time is achieved on fastening of the detent hooks to the gas bag module.

Preferably, the detent hooks are formed from flat sheet metal strips. In a preferred embodiment of the invention, the base part forms a rigid frame. In the latter case, the detent hooks can be arranged, before bending, in the recess of the frame (i.e. the detent hooks begin from the inner side of the frame), so that the material inside the frame, which otherwise is discarded as waste, can be used for the production of the detent hooks.

The carrier plate is preferably a punched part, but it may also be cut out from a larger plate in a different way. In manufacture, the detent hooks extend in the same plane as the base section. In order to be able to take over the function of fastening the gas bag module to the vehicle, the detent hooks are bent at right-angles from the carrier plate. A different angle is also conceivable, depending on the direction of stress.

The carrier plate can be connected in one piece with another component of the gas bag module. It is possible, for example, to construct the carrier plate in one piece with a module housing, with a gas bag holding element or with a gas generator holding element. If the carrier plate is part of a ring-shaped holding element, the material inside the ring can be used for the manufacture of the detent hooks, as described above.

It would also be conceivable to construct the carrier plate in one piece with a gas generator.

On the other hand, it is of course also possible to construct the carrier plate as a separate component and to connect it securely with a module housing or with a gas generator holding element. In this case, the carrier plate can fulfil a reinforcement function for the module housing or for the gas generator holding element, which is particularly advantageous when these components consist of plastic.

As an additional function, the carrier plate can also form a horn contact so that, with the use of a plastic module housing, no additional component has to be used.

In a further preferred embodiment of the invention the gas bag module is integrated into a cover cap.

In this case the cover cap can be provided with side walls projecting from a front wall, the side walls carrying pivotably arranged flaps and the carrier plate being connected with the flaps. A secure attachment of the cover cap to the carrier plate and to the vehicle is ensured by the flaps.

DETAILED DESCRIPTION OF PREFERRED EMBODIMENTS

Figure 1:
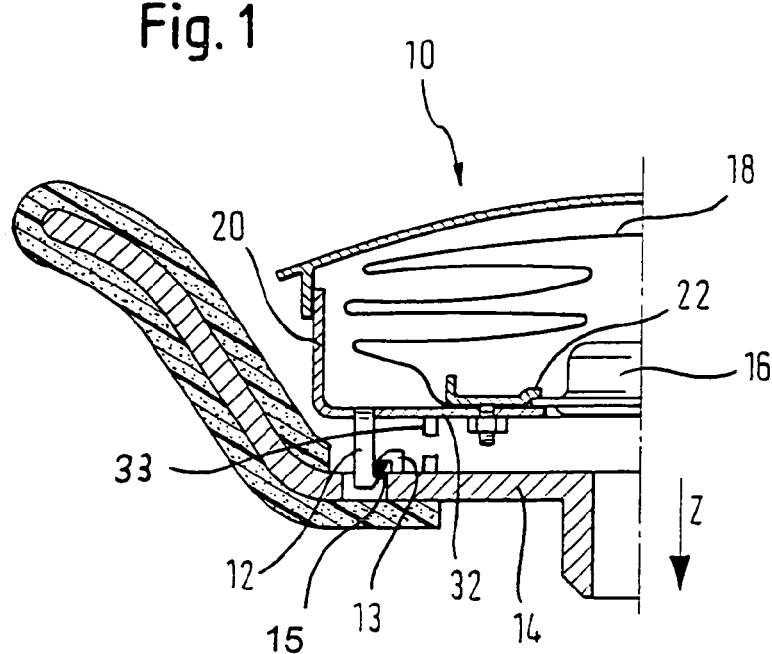
FIG. 1 shows a diagrammatic partial sectional view of a gas bag module according to the invention in accordance with a first embodiment.

FIG. 1 shows a gas bag module 10 according to a first embodiment, which is fastened by means of several detent hooks 12 to a part 14 which is fixed to the vehicle, a steering wheel in the case shown here. For this, the detent hooks 12 engage into a complementary detent element 15 which is held in hooks 13 fixed to the vehicle. The gas bag module 10 contains a gas generator 16 and also a folded gas bag 18. The gas generator 16 and the gas bag 18 are held in a known manner in a module housing 20 which in the embodiments shown here also serves as a gas generator holding element at the same time. However, as gas generator holding element, a separate component may also be provided. The gas bag 18 is fastened by means of a gas bag holding element 22 to the module housing 20. The detent hooks 12 are constructed so that a displacement of the gas bag module in axial direction Z, e.g. to actuate a horn, is possible.

The detent hooks 12 are a component of a carrier plate 30 which is shown in various embodiments in FIGS. 3 to 10. The carrier plate 30 has a substantially flat, rigid, frame-shaped base section 32, from which the detent hooks 12 project. The detent hooks 12 are formed in one piece with the base section 32.

The carrier plate 30 is produced as a punched part from a metal plate, preferably a steel plate. Of course, other methods are also able to be used for cutting out the carrier plate from a metal plate.

Directly after cutting, the detent hooks 12 lie in the same plane as the base section 32, as can be seen in FIGS. 4, 5, 6 and 8 to 10.

Each of the detent hooks 12 has at its free end an abutment surface 40 for engagement into the detent element 15, and also has a chamfered sliding surface 42, the sliding surface 42 making possible the insertion of the module 10 for example into the steering wheel.

Before installation into the gas bag module 10, the detent hooks 12 are bent at right-angles from the base section 32. A further deformation of the detent hooks 12 can be omitted.

Instead of being constructed in a frame shape, the carrier plate 30 can also be constructed in the form of a continuous plate or in another suitable shape.

In the embodiment of the gas bag module 10 shown in FIG. 1, the carrier plate 30 is a component part of the module housing 20. The base section 32 is formed here by a section of the module base.

Figure 2:
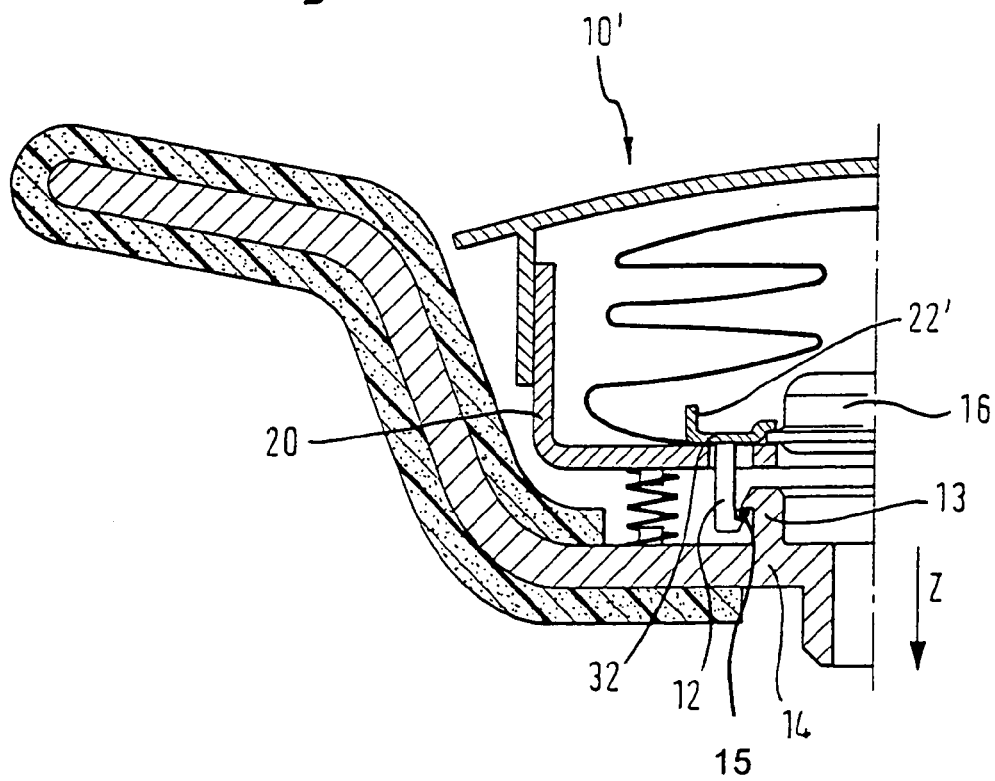
FIG. 2 shows a diagrammatic partial sectional view of a gas bag module according to the invention in accordance with a second embodiment.
Figure 3:
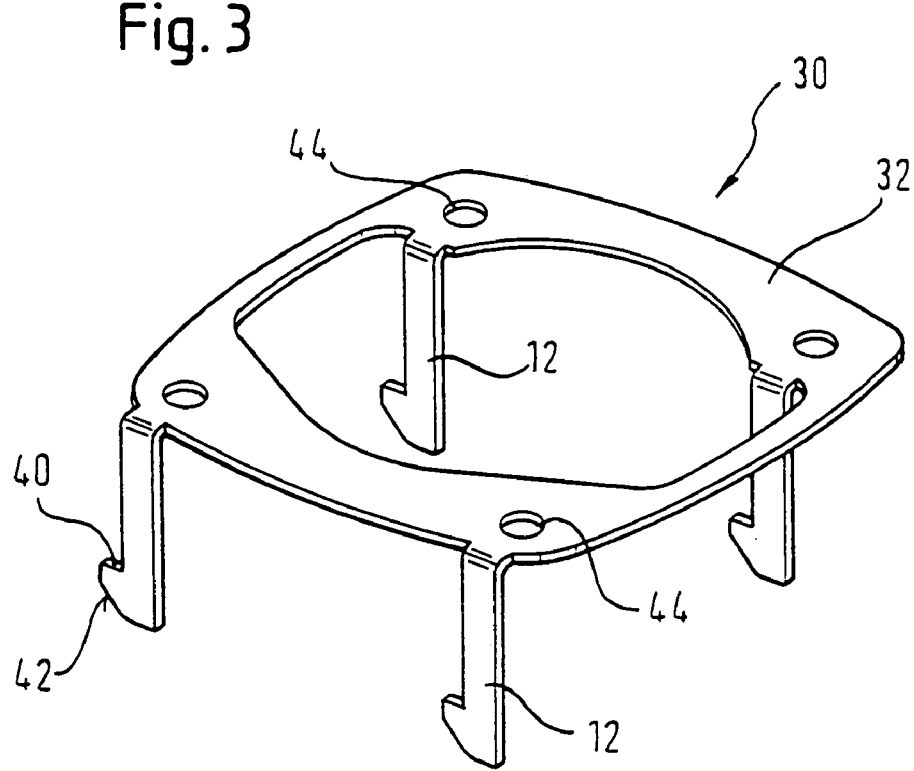
FIG. 3 shows a perspective view of a carrier plate for a gas bag module according to the invention.
Figure 4:
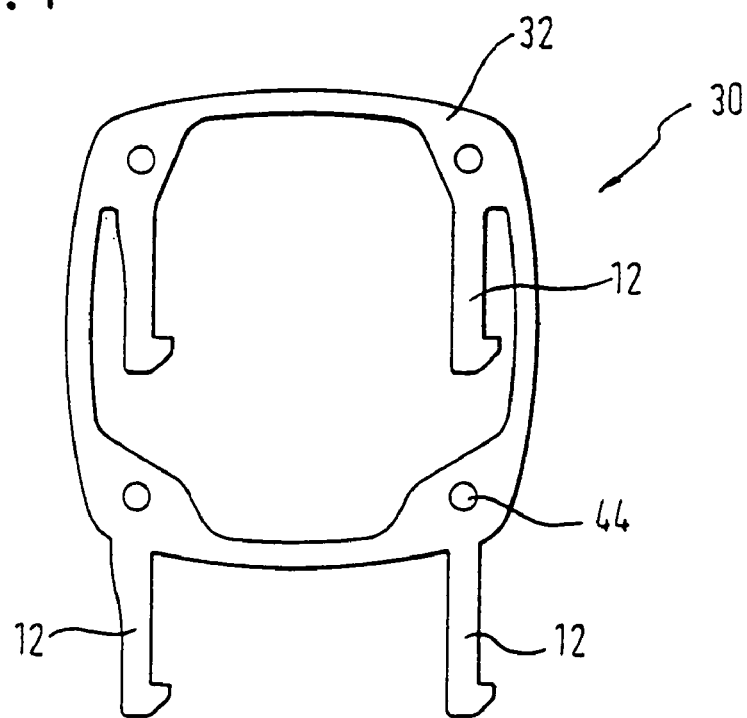
FIGS. 4 to 6 show various embodiments of carrier plates for a gas bag module according to the invention before the bending of the detent hooks.
Figure 5:
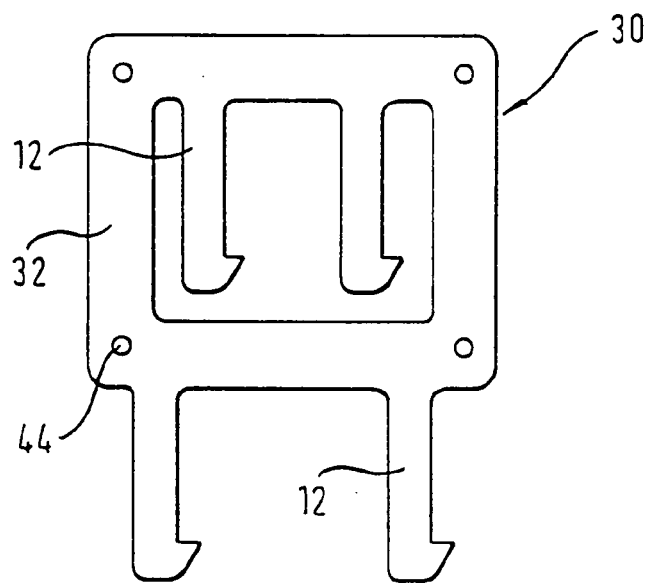
Figure 6:
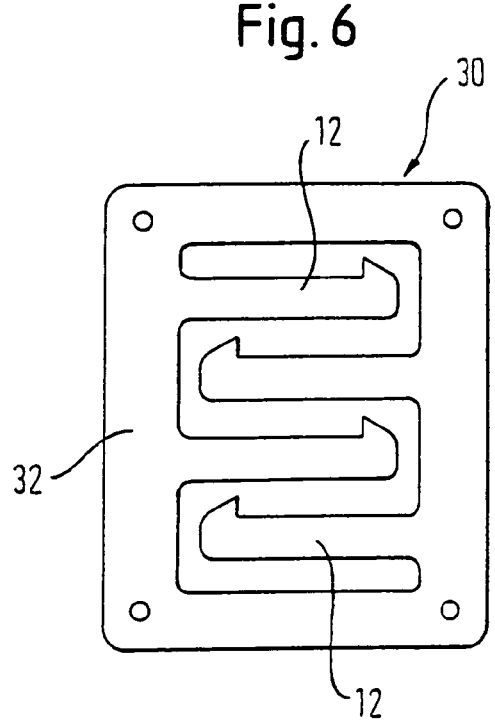
Figure 7:
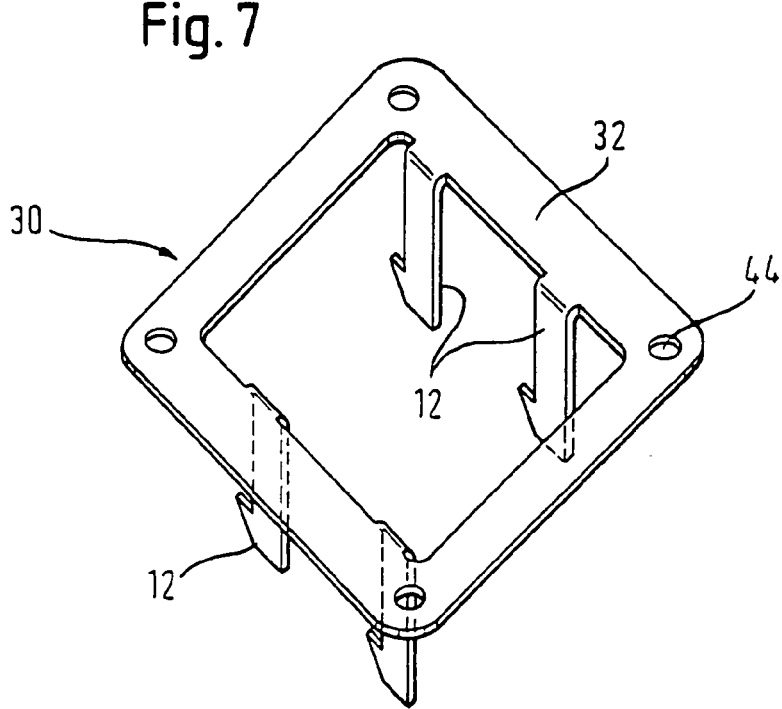
FIG. 7 shows a perspective view of a carrier plate for a gas bag module according to the invention.

In the second embodiment of the gas bag module 10', shown in FIG. 2, the carrier plate 30 is constructed in one piece with the gas bag holding element 22'. The base section 32 is formed here by a part of the ring-shaped gas bag holding element 22'. The base section 32 has several fastening holes 44 which serve, inter alia, for the screwing of the gas bag holding element 22' to the module housing 20.

With the use of a ring-shaped or frame-shaped base section 32, the material of the interior of the frame, which would otherwise be discarded as waste, can be used for the construction of some or all of the detent hooks 12.

Depending on the dimensions of the carrier plate 30, for example only two (see FIGS. 4, 5 and 9) or all four detent hooks 12 (see FIGS. 6 and 8) can be arranged inside the frame. After the cutting out or punching out of the carrier plate 30 from a larger plate, all the detent hooks 12 are bent out from the plane of the base section 32.

In another embodiment (see FIG. 13) the carrier plate 30 is a separate component from the gas bag module 10, which is fastened to the underside of the module, e.g. by screws, using the fastening holes 44. In this case, the base section 32 can be constructed for example in a frame shape as shown or filled (not shown). In such an embodiment, the carrier plate 30 serves at the same time to reinforce the module housing 20. The same also applies to the case in which the role of the module housing is taken over by a gas generator holding element.

The use of a carrier plate 30 constructed in one piece with a gas generator holding element has advantage that the forces occurring on ignition of the gas generator can be diverted directly via the detent hooks to a component which is fixed to the vehicle.

In substantially rectangular gas bag modules, preferably four detent hooks 12 are provided. With the use of round gas bag modules, as shown in FIG. 10, a use of a different number of detent hooks 12 is also conceivable, for example three or five.

Figure 8:
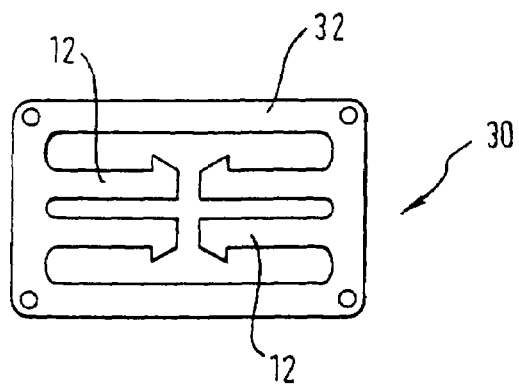
FIGS. 8 to 10 show various embodiments of carrier plates for a gas bag module according to the invention before the bending of the detent hooks.
Figure 9:
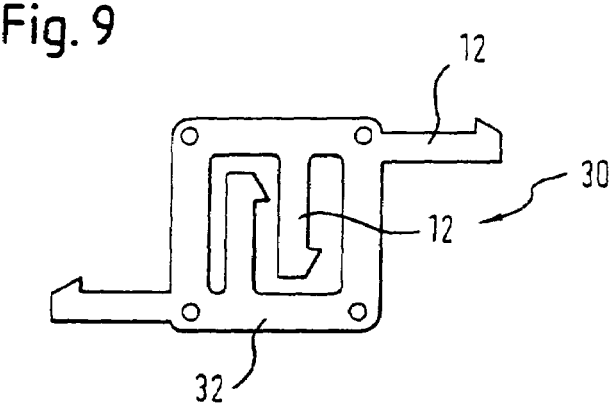
Figure 10:
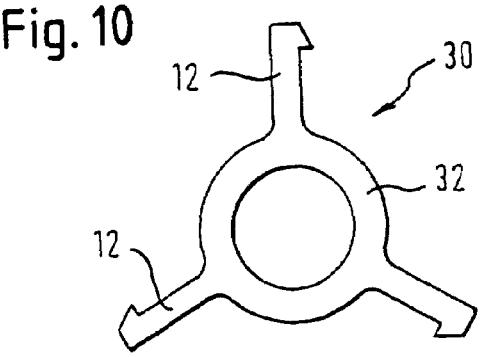

The detent hooks 12 can all be aligned in one direction (see for example FIG. 3), but it is also possible, as FIGS. 8 to 10 show, to provide an alignment of the detent hooks 12 in different directions.

When the gas bag module is constructed as a so-called floating horn module, the carrier plate 30 or respectively the detent hooks 12 can also be used as horn contact 33 (see FIG. 1).

As the detent hooks 12 are always only stressed in their longitudinal direction, normally a further reinforcement of the detent hooks 12 by further deformation steps or by the introduction of beads, is not necessary. To increase the stability of the base section 32, it can be provided with beaded edge sections, beads or the like.

In another embodiment of the invention, which is not illustrated, a cage encompassing the gas generator is provided in the gas bag module, the detent hooks being formed on this cage.

Figure 14:
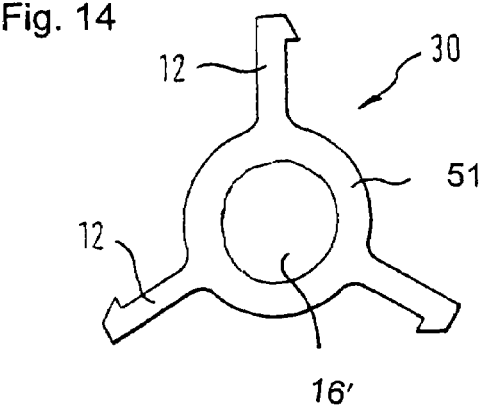
FIG. 14 shows a gas generator with a carrier plate for use with a gas bag module according to the invention.

The carrier plate 30 can also be formed in one piece with a flange 51 of a gas generator 16', as is shown in FIG. 14. The arrangement and the number of the detent hooks 12 are of course variable.

Figure 12:
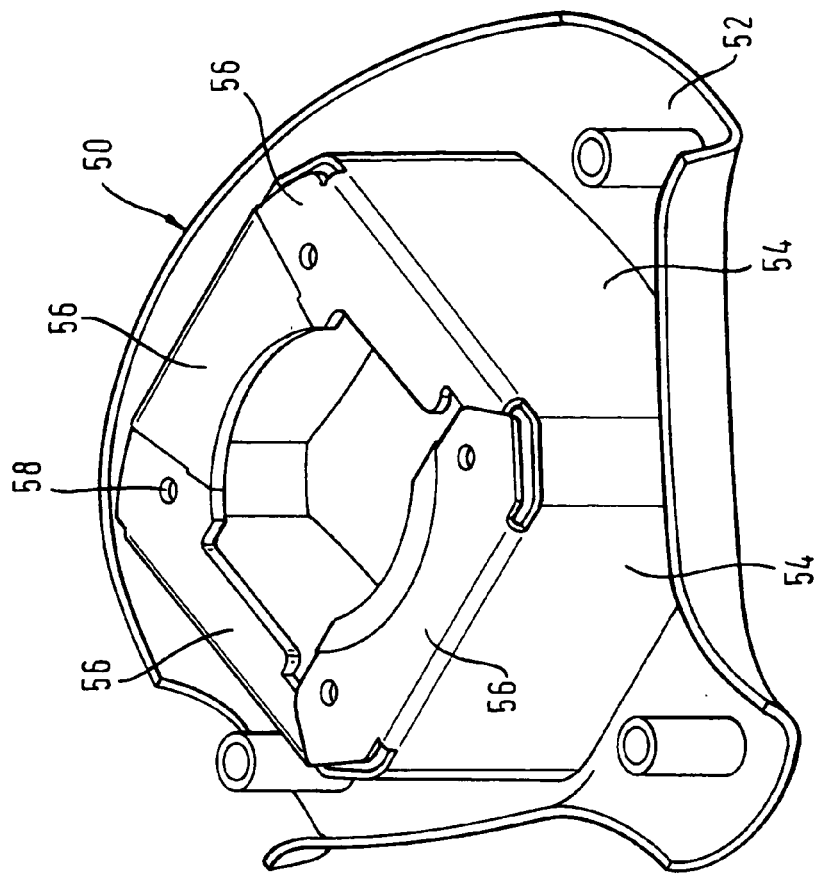
FIG. 12 shows the cover cap of FIG. 11 with closed flaps.
Figure 11:
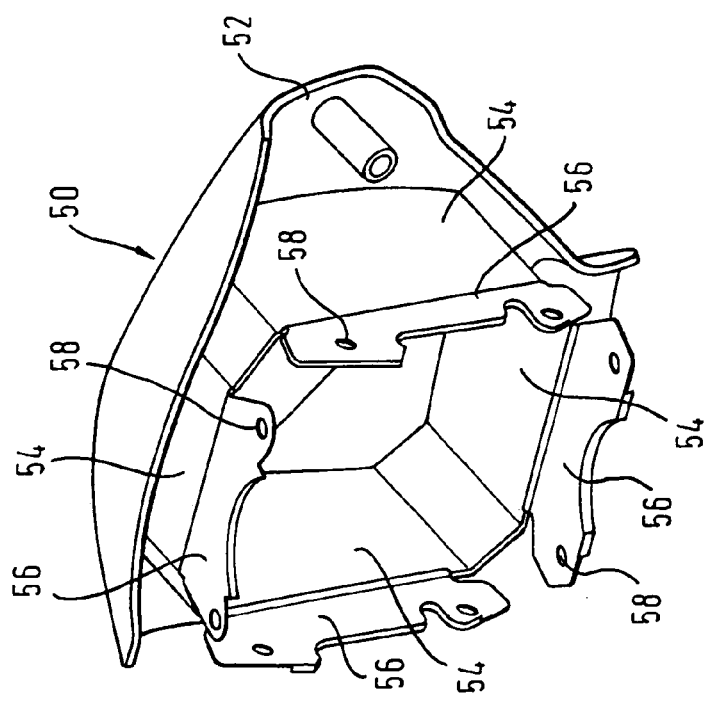
FIG. 11 shows a cover cap of a gas bag module according to a third embodiment of the invention, with open flaps.
Figure 13:
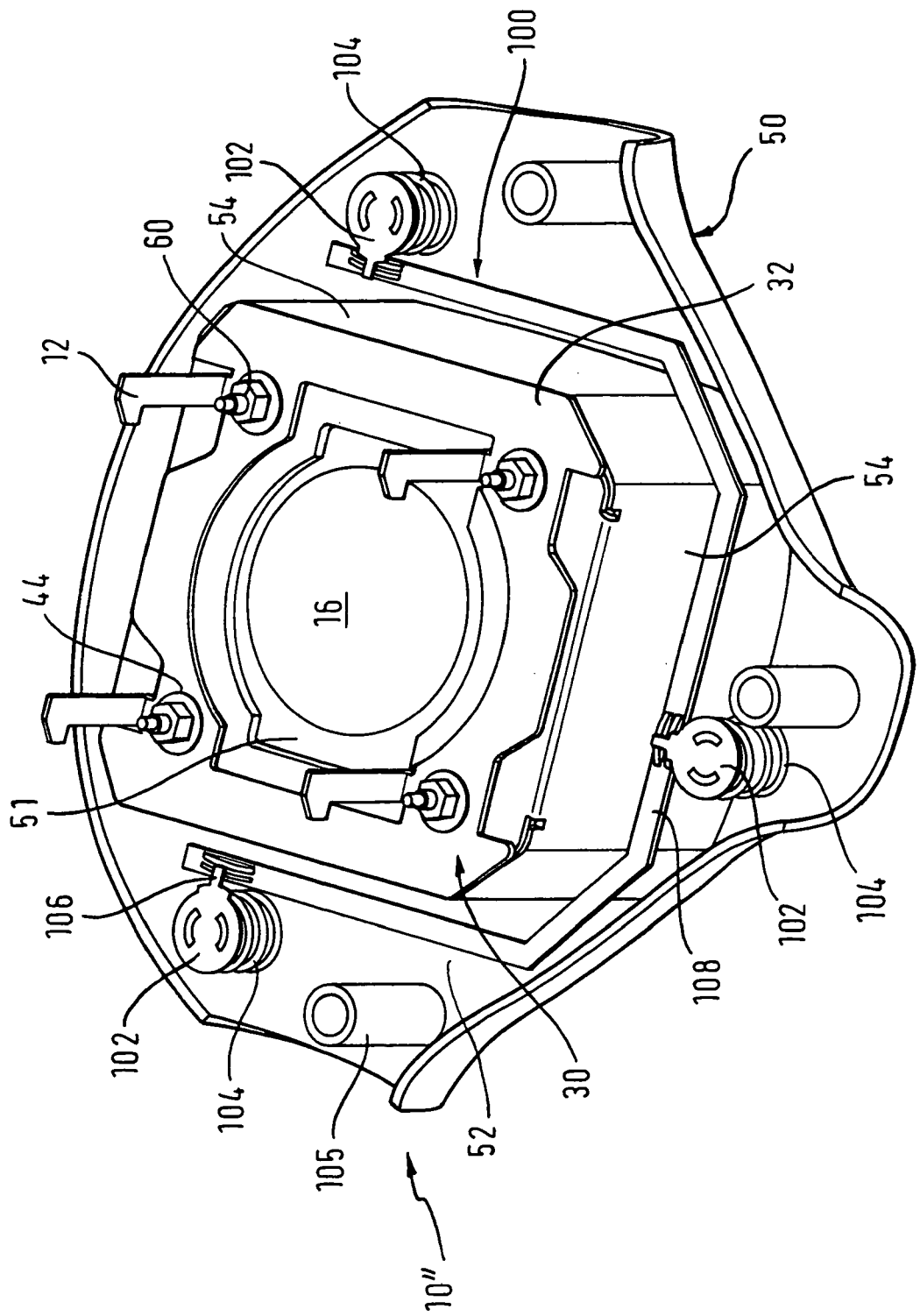
FIG. 13 shows a gas bag module according to the third embodiment of the invention.

In the embodiment shown in FIGS. 11 to 13, the gas bag module 10" is integrated into a cover cap 50 (FIG. 13) closing the gas bag module 10" off against an interior of a vehicle in a mounted state of the gas bag module. The cover cap 50 has a front wall 52 comprising a surface visible from the outside of the gas bag module and four side walls 54 projecting inwards from the front wall 52. The side walls 54 form a receptacle for a gas generator 16 with a radially projecting flange 51 and a gas bag arranged below the gas generator 16 (which is, therefore, not visible in FIG. 13).

On the ends of the side walls 54 opposite the front wall 52, flaps 56 are formed, which are each connected to one of the side walls 54 via a film hinge and are able to be pivoted inwards. Each flap 56 has two fastening openings 58, which are arranged such that, in a closed state (FIG. 12), two fastening openings 58 of neighbouring flaps 56 overlap.

The pivoted flaps 56 are connected with each other by screw connections 60 extending through the fastening openings 58 and are connected with the flange 51 of the gas generator 16, the gas bag and a separate carrier plate 30. The flat base section 32 of the carrier plate 30 lies on the flaps 56, with the detent hooks 12 projecting in right angles from the base section 32 and facing away from the cover cap 50. The detent hooks 12 allow to mount the cover cap 50 to a steering wheel.

On assembly of the gas bag module 10", the gas generator 16 is inserted into the gas bag and fixed to a gas inlet of the gas bag in a known way, for instance via a retainer ring. The assembly containing the folded gas bag and the gas generator 16 is put into the receptacle formed by the side walls 54, and the flaps 56 are pivoted inwards by an angle of 90°. The carrier plate 30 is positioned so that the fastening holes 44 provided therein come to lie over the fastening openings 58. Fastening means of the screw connection 60, e.g. bolts provided on the retainer ring, are inserted through the fastening openings 58 and fastening holes 44. Finally, nuts are screwed on the bolts.

In the example shown here, a horn mechanism 100 is also provided in the cover cap 50. First electrical contacts 102 are arranged on the free ends of return springs 104. The return spring 104 are stuck on guides 105 projecting from the front wall 52.

Each contact 102 is connected via a resilient contact arm 106 with an elongated second contact element 108, which is bent into a u-shape. However, an electrical contact will be only established when the cover cap 50 is pushed into the steering wheel.

A relative movement between the first contacts 102 and the second contact element 108 is made possible e.g. in that the return springs 104 are supported on a part fixed relatively to the steering wheel (not shown).

The invention claimed is:

1. A gas bag module, comprising:

several detent hooks (12) by which said gas bag module can be fastened to a component (14) which is fixed to a vehicle, and a sheet metal carrier plate (30) with a substantially flat base section (32), forming a rigid frame, said detent hooks (12), before bending, being arranged in a recess of said frame, and said detent hooks (12) being connected in one piece with said base section (32) and projecting therefrom.

2. The gas bag module according to claim 1, wherein said carrier plate (30) is constructed in one piece with a gas generator holding element (20).

3. The gas bag module according to claim 1, wherein it further comprises a module housing (20), said carrier plate (30) being constructed in one piece with said module housing.

4. The gas bag module according to claim 1, wherein said carrier plate (30) is a separate component and is firmly connected with another component of said gas bag module (10").

5. A gas bag module, comprising:
a module housing (20),
a gas bag (18),
a gas bag holding element (22') fastening said gas bag (18) to said module housing (20),
several detent hooks (12) by which said gas bag module (20) can be fastened to a component (14) which is fixed to a vehicle, and
a sheet metal carrier plate (30) with a substantially flat base section (32), said carrier plate (30) being constructed in one piece with said gas bag holding element (22'),
said several detent hooks (12) being connected in one-piece with said base section (32) and projecting therefrom.

6. A gas bag module, comprising:
a gas generator (16),
several detent hooks (12) by which said gas bag module can be fastened to a component (14) which is fixed to a vehicle, and
a sheet metal carrier plate (30) with a substantially flat base section (32),
said several detent hooks (12) being connected in one piece with said base section (32) and projecting therefrom,
said carrier plate being constructed in one piece with said gas generator (16).

7. The gas bag module according to claim 6, wherein said detent hooks (12) are flat sheet metal strips.

8. The gas bag module according to claim 6, wherein said detent hooks (12) are bent at right-angles from said base section (32).

9. The gas bag module according to claim 6, wherein said base section (32) forms a rigid frame.

10. The gas bag module according to claim 6, wherein said carrier plate (30) is a punched part.

11. A gas bag module, comprising:
several detent hooks (12) by which said gas bag module can be fastened to a component (14) which is fixed to a vehicle, and
a sheet metal carrier plate (30) with a substantially flat base section (32),
said several detent hooks (12) being connected in one piece with said base section (32) and projecting therefrom,
said carrier plate (30) forming a horn contact (33).

12. A gas bag module (10"), comprising:
a cover cap (50),
several detent hooks (12) by which said gas bag module can be fastened to a component (14) which is fixed to a vehicle, and
a sheet metal carrier plate (30) with a substantially flat base section (32),
said several detent hooks (12) being connected in one piece with said base section (32) and projecting therefrom,
said gas bag module (10") being integrated into said cover cap (50), said cover cap (50) having side walls (54) projecting from a front wall (52) and flaps (56) arranged pivotably on said side walls (54), said carrier plate (30) being connected with said flaps (56).

13. A gas bag module comprising:
a plurality of detent hooks (12) for fastening said gas bag module to a component (14) of a vehicle, and
a sheet metal carrier plate (30) having a substantially flat base section (32) lying in a plane and forming a rigid frame, said detent hooks (12) being arranged in a recess of said rigid frame and also lying in said plane before bending, and
said detent hooks (12) and said base section (32) being one-piece and not separate pieces attached together, said detent hooks projecting from said base section (32) toward said component (14).

* * * * *